United States Patent
Shiozaki et al.

(10) Patent No.: US 7,419,040 B2
(45) Date of Patent: *Sep. 2, 2008

(54) EXTERNAL CONTROL TYPE FAN-COUPLING DEVICE

(75) Inventors: Ken Shiozaki, Susono (JP); Shigeyuki Serizawa, Gotenba (JP)

(73) Assignee: Usui Kokusai Sangyo Kaisha Limited (JP)

( * ) Notice: Subject to any disclaimer, the term of this patent is extended or adjusted under 35 U.S.C. 154(b) by 216 days.

This patent is subject to a terminal disclaimer.

(21) Appl. No.: 11/268,865

(22) Filed: Nov. 8, 2005

(65) Prior Publication Data

US 2006/0096830 A1    May 11, 2006

(30) Foreign Application Priority Data

Nov. 9, 2004  (JP) ............................. 2004-325663
Oct. 17, 2005  (JP) ............................. 2005-301579

(51) Int. Cl.
    *F16D 35/02*  (2006.01)
(52) U.S. Cl. ................................. 192/58.61; 192/82 T
(58) Field of Classification Search .............. 192/58.61, 192/58.8
    See application file for complete search history.

(56) References Cited

U.S. PATENT DOCUMENTS

| | | |
|---|---|---|
| 2,879,755 A | 3/1959 | Weir |
| 2,988,188 A | 6/1961 | Tauschek |
| 3,059,745 A | 10/1962 | Tauschek |
| 3,217,849 A | 11/1965 | Weir |
| 3,259,221 A | 7/1966 | Godfrey |
| 3,272,188 A | 9/1966 | Sabat |
| 3,430,743 A | 3/1969 | Fujita et al. |
| 3,463,282 A | 8/1969 | Fujita et al. |
| 3,642,105 A | 2/1972 | Kikuchi |
| 3,727,354 A | 4/1973 | La Flame |
| 3,840,101 A | 10/1974 | Peter et al. |
| 3,856,122 A | 12/1974 | Leichiter |
| 3,893,555 A | 7/1975 | Elmer |
| 3,964,582 A | 6/1976 | Mitchell |
| 4,238,016 A | 12/1980 | Yoshida et al. |
| 4,281,750 A | 8/1981 | Clancey |
| 4,403,684 A | 9/1983 | Haeck |
| 4,505,367 A | 3/1985 | Martin |
| 4,629,046 A | 12/1986 | Martin |
| 4,665,694 A | 5/1987 | Brunken |
| 4,667,791 A | 5/1987 | Martin et al. |
| 4,685,549 A | 8/1987 | Brunken et al. |
| 4,699,258 A | 10/1987 | Johnston et al. |

(Continued)

FOREIGN PATENT DOCUMENTS

DE    3625976 A1    0/1988

(Continued)

*Primary Examiner*—Richard M. Lorence
*Assistant Examiner*—Edwin A. Young
(74) *Attorney, Agent, or Firm*—Gerald E. Hespos; Anthony J. Casella

(57) ABSTRACT

An external-control-type fan coupling device is provided and has no restriction on the layout or positional relationship of an electromagnetic coil and a valve element of the device. As a result, the casing and the valve structure of the device can be simplified. Additionally, the design prevents leaking of oil and leaking of magnetism without adversely affecting performance.

15 Claims, 7 Drawing Sheets

U.S. PATENT DOCUMENTS

| | | | |
|---|---|---|---|
| 4,796,571 A | 1/1989 | Ono et al. | |
| 4,846,331 A | 7/1989 | Ono | |
| 4,850,643 A | 7/1989 | Rollman | |
| 4,903,643 A | 2/1990 | Takikawa et al. | |
| 4,930,458 A | 6/1990 | Takikawa et al. | |
| 5,004,085 A | 4/1991 | Taureg | |
| 5,018,612 A | 5/1991 | Takikawa et al. | |
| 5,030,865 A | 7/1991 | Rockey et al. | |
| 5,060,774 A | 10/1991 | Takikawa et al. | |
| 5,090,533 A | 2/1992 | Inoue | |
| 5,101,949 A | 4/1992 | Takikawa et al. | |
| 5,109,965 A | 5/1992 | Inoue | |
| 5,119,920 A | 6/1992 | Inoue | |
| 5,125,491 A | 6/1992 | Takikawa et al. | |
| 5,139,125 A | 8/1992 | Takikawa et al. | |
| 5,232,074 A | 8/1993 | Watanabe | |
| 5,452,782 A | 9/1995 | Inoue | |
| 5,501,183 A | 3/1996 | Takayama | |
| 5,575,368 A | 11/1996 | Kikuchi et al. | |
| 5,794,749 A | 8/1998 | Ryuu | |
| 5,881,857 A | 3/1999 | Ryuu | |
| 6,125,981 A | 10/2000 | Ito et al. | |
| 6,247,567 B1 | 6/2001 | Watanabe | |
| 6,443,283 B1 | 9/2002 | Augenstein et al. | |
| 6,550,596 B2 | 4/2003 | Shiozaki et al. | |
| 6,634,476 B2 | 10/2003 | Inoue et al. | |
| 6,695,113 B2 | 2/2004 | Lutz | |
| 6,807,926 B2 | 10/2004 | Shiozaki et al. | |
| 6,811,009 B2 | 11/2004 | Inoue et al. | |
| 6,915,888 B2 | 7/2005 | Shiozaki et al. | |
| 2002/0005328 A1* | 1/2002 | Heinle et al. | 192/58.61 |
| 2002/0121420 A1* | 9/2002 | Medamaranahally | 192/58.61 |
| 2005/0045443 A1* | 3/2005 | Tilly | 192/58.61 |
| 2006/0272918 A1* | 12/2006 | Shiozaki et al. | 192/58.61 |

FOREIGN PATENT DOCUMENTS

| | | |
|---|---|---|
| DE | 3941610 A1 | 0/1991 |
| DE | 19732417 A1 | 0/1999 |
| JP | 54-25581 | 8/1979 |
| JP | 55-76226 | 6/1980 |
| JP | 57-1829 | 1/1982 |
| JP | 57-167533 | 10/1982 |
| JP | 57-179431 | 11/1982 |
| JP | 59-27452 | 7/1984 |
| JP | 62-124330 | 6/1987 |
| JP | 62-194038 | 8/1987 |
| JP | 63-182232 | 11/1988 |

* cited by examiner

EXTERNAL CONTROL TYPE FAN-COUPLING DEVICE

BACKGROUND OF THE INVENTION

1. Field of the Invention

The present invention generally relates to an external control type fan-coupling device of a system for controlling the rotation of a fan for cooling an engine in an automobile, etc. by following-up a temperature change of the external circumference or a rotation change.

2. Description of Related Art

The following fan-coupling device is conventionally known as the fan-coupling device of this kind. Namely, in this fan-coupling device, a drive disk is fixedly attached to the tip of a rotating shaft body (drive shaft). A seal device housing is constructed by a case of a nonmagnetic material supported on the rotating shaft body through a bearing, and a cover attached to this case. The interior of the seal device housing is partitioned into an oil reservoir chamber and a torque transmitting chamber for internally mounting the drive disk by a partition plate having a supply adjusting hole of oil. A valve member having a magnetic property opening and closing an oil circulating flow passage formed between the above torque transmitting chamber and the oil reservoir chamber is arranged within the oil reservoir chamber. The opening and closing of the above oil circulating flow passage are mechanically controlled by operating the valve member by an actuator. The transmission of rotation torque from the drive side to the driven side is controlled by increasing and decreasing an effective contact area of the oil in a torque transmitting clearance portion formed by the drive side and the driven side.

As the external control type fan-coupling device of this kind, there is an external control type fan-coupling device of a system for operating the actuator within the coupling device by magnetizing an electromagnetic coil fixed to the engine or the vehicle body side, and controlling the fan rotation from the exterior (see U.S. Pat. No. 6,443,283). Its structure is set to a system constituting a magnetic loop for transmitting a magnetic flux using the magnetization of the electromagnetic coil to the valve member through a magnetic path of a magnetic material (a shaft and a valve member) of high magnetic permeability, and again returning the magnetic flux to the electromagnetic coil. A voltage is applied to the electromagnetic coil by an input signal from ECU. The flow rate of the torque transmitting oil is controlled by opening and closing the valve member within the coupling device by this electromagnetic force.

However, there are defects described below in the case of the above conventional external control type fan-coupling device.

Namely, in the case of the system for performing an operation by transmitting the magnetic flux for magnetizing the electromagnetic coil fixed to the exterior to the valve member within the coupling device, it is necessary to construct the magnetic loop for transmitting the magnetic flux using the magnetization of the electromagnetic coil to the valve member through the magnetic path of the magnetic material (a shaft and the valve member) of high magnetic permeability, and again returning the magnetic flux to the electromagnetic coil. Therefore, there are the following defects, etc. Namely, there is a restriction of a layout in the position relation of the electromagnetic coil and the valve member. The case and the valve structure become complicated. There is a fear that the oil is leaked by assembling magnetic material parts for constructing the magnetic loop into the coupling device. Magnetic leakage is much since a magnetic circuit is long. The general purpose property of the system with respect to the fan-coupling device different in size is poor.

SUMMARY OF THE INVENTION

The present invention is made to solve the defects of the above conventional external control type fan-coupling device, and provides an external control type fan-coupling device in which there is no restriction of the layout in the position relation of the electromagnetic coil and the valve member, and the case and the valve structure are simplified and the device is made compact and light in weight and the oil leakage and the magnetic leakage are prevented, and the device is rich in the general purpose property of the system.

The external control type fan-coupling device in the present invention is set to a system in which an electric generator for supplying an electric current is assembled into the coupling device by utilizing the rotation of a drive shaft (rotating shaft body), and an actuator for operating a valve member is operated. Its gist resides in an external control type fan-coupling device in which a seal device housing is constructed by a case of a nonmagnetic material supported through a bearing on a rotating shaft body fixedly attaching a drive disk to its tip, and a cover attached to the case; the interior of the seal device housing is partitioned into an oil reservoir chamber and a torque transmitting chamber for internally mounting the drive disk by a partition plate fixedly attached to the cover; an oil circulating flow passage formed between the torque transmitting chamber and the oil reservoir chamber, and an oil supply adjusting hole formed in the partition plate are arranged; a valve member for opening and closing the oil supply adjusting hole is arranged within the oil reservoir chamber; a mechanism for controlling the oil circulating flow passage so as to be opened and closed by operating the valve member by an actuator is set; and the transmission of rotation torque from the drive side to the driven side is controlled by increasing and decreasing an effective contact area-of oil in a torque transmitting clearance portion formed by the drive side and the driven side; wherein the actuator is attached to the cover of the seal device housing; a permanent magnet fixed to the exterior, and an electromagnetic coil fixed to the coupling device side and opposed to the permanent magnet are arranged; a mechanism for operating the actuator attached to the cover of the seal device housing by electric power generated in the electromagnetic coil is set; and an ON/OFF switch of the actuator is arranged.

In the case of this external control type fan-coupling device, a valve member opening-closing mechanism may be constructed such that the actuator for operating the valve member is made compact, and this compact actuator is attached to the cover of the seal device housing so as to be eccentric with respect to the rotating shaft body.

The present invention also resides in another external control type fan-coupling device in which a seal device housing is constructed by a case of a nonmagnetic material supported through a bearing on a rotating shaft body fixedly attaching a drive disk to its tip, and a cover attached to the case; the interior of the seal device housing is partitioned into an oil reservoir chamber and a torque transmitting chamber for internally mounting the drive disk by a partition plate fixedly attached to the drive disk; an oil circulating flow passage formed between the torque transmitting chamber and the oil reservoir chamber, and an oil supply adjusting hole formed in the partition plate are arranged; a valve member for opening and closing the oil supply adjusting hole is arranged within the oil reservoir chamber; a mechanism for controlling the oil circulating flow passage so as to be opened and closed by operating the valve member by an actuator is set; and the transmission of rotation torque from the drive side to the driven side is controlled by increasing and decreasing an effective contact area of oil in a torque transmitting clearance portion formed by the drive side and the driven side; wherein the actuator is arranged within the rotating shaft body; a system for extending a control bar operated by the actuator through the interior of the rotating shaft body in the axial direction, and controlling the operation of the valve member is set; a permanent magnet fixed to the exterior, and an electromagnetic coil fixed to the coupling device side and opposed to the permanent magnet are arranged; a mechanism for operating the actuator arranged within the rotating shaft body by electric power generated in the electromagnetic coil is set; and an ON/OFF switch of the actuator is arranged.

Further, the external control type fan-coupling device of the present, invention can be also set to a system in which an alternating electric current induced in the electromagnetic coil is rectified to a direct current by a rectifier and the actuator is operated. Further, a rotary type solenoid type or a straight advancing type solenoid type may be used in the actuator.

The external control type fan-coupling device of the present invention has the system in which electric power is supplied by the electric generator constructed by the permanent magnet and the electromagnetic coil assembled into the coupling device main body, and the actuator for operating the valve member is operated by this electric power. Accordingly, the following effects, etc. are obtained. Namely, it is not necessary to construct a complicated magnetic circuit (magnetic loop) as in the conventional structure so that the structure is simplified and there is almost no fear of oil leak. Further, magnetic leak is very little and the electric generator and the actuator are electrically connected to each other by a lead wire. Therefore, the restriction of a layout is very little in the position relation of both the electric generator and the actuator. Further, since the restriction of a size is little in an actuator portion, it is rich in general purpose property. Further, since the system for operating the actuator in accordance with necessity by a signal from the exterior in a state always generating electricity is used, response property is good so that the rotating control property of a fan can be improved. Furthermore, it is not necessary to set the coil to be large-sized even when a large-sized external control type fan-coupling device is formed to operate a large aperture fan for a large-sized vehicle and the position of an oil supply hole is separated from the rotation center of the device. Accordingly, since the external control type fan-coupling device can be operated by the coil of a small diameter, the device can be made compact and light in weight, and layout property is improved.

DESCRIPTION OF THE PREFERRED EMBODIMENTS

Figure 1:
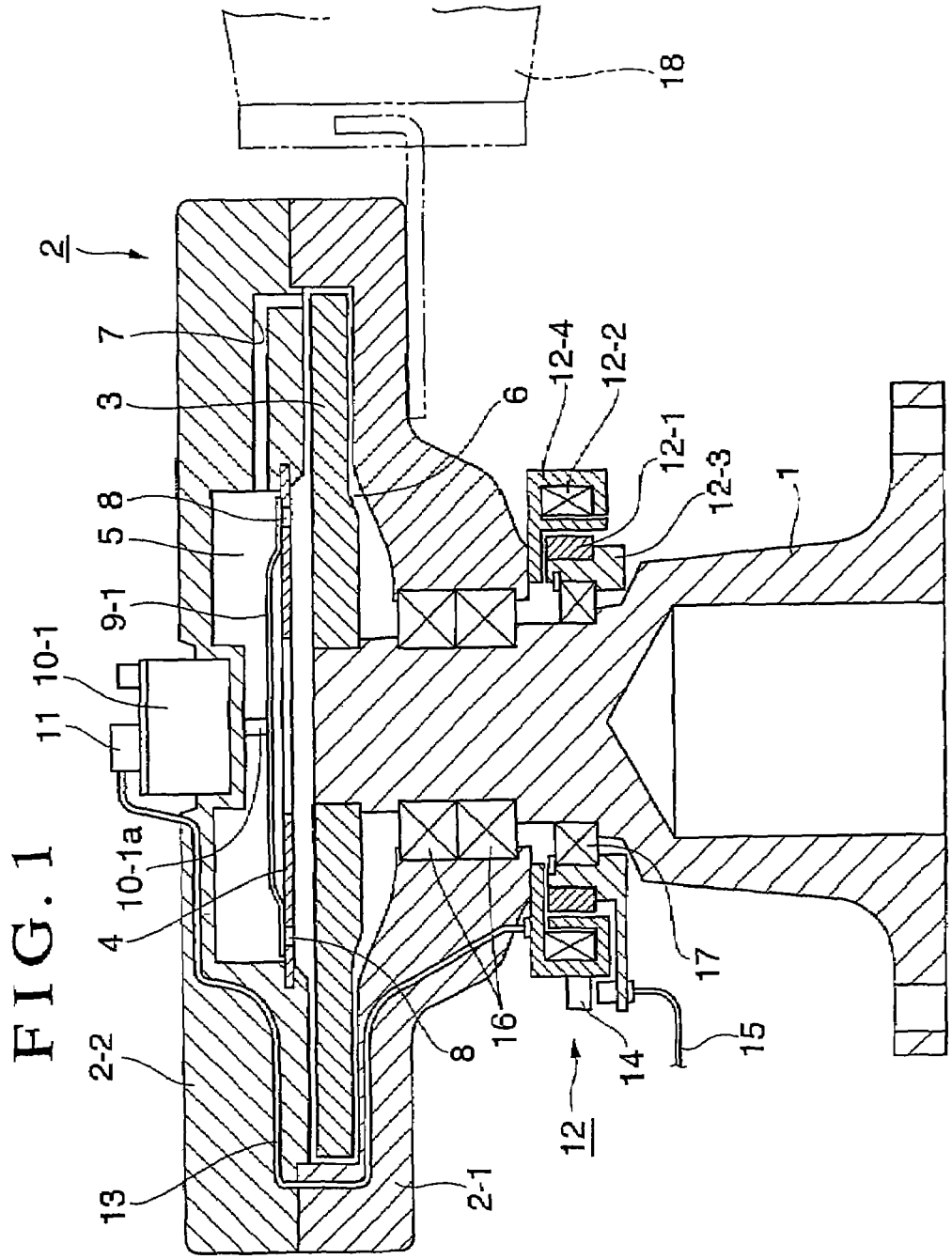
FIG. 1 is a longitudinal sectional view showing a first embodiment of an external control type fan-coupling device in the present invention.
Figure 2:
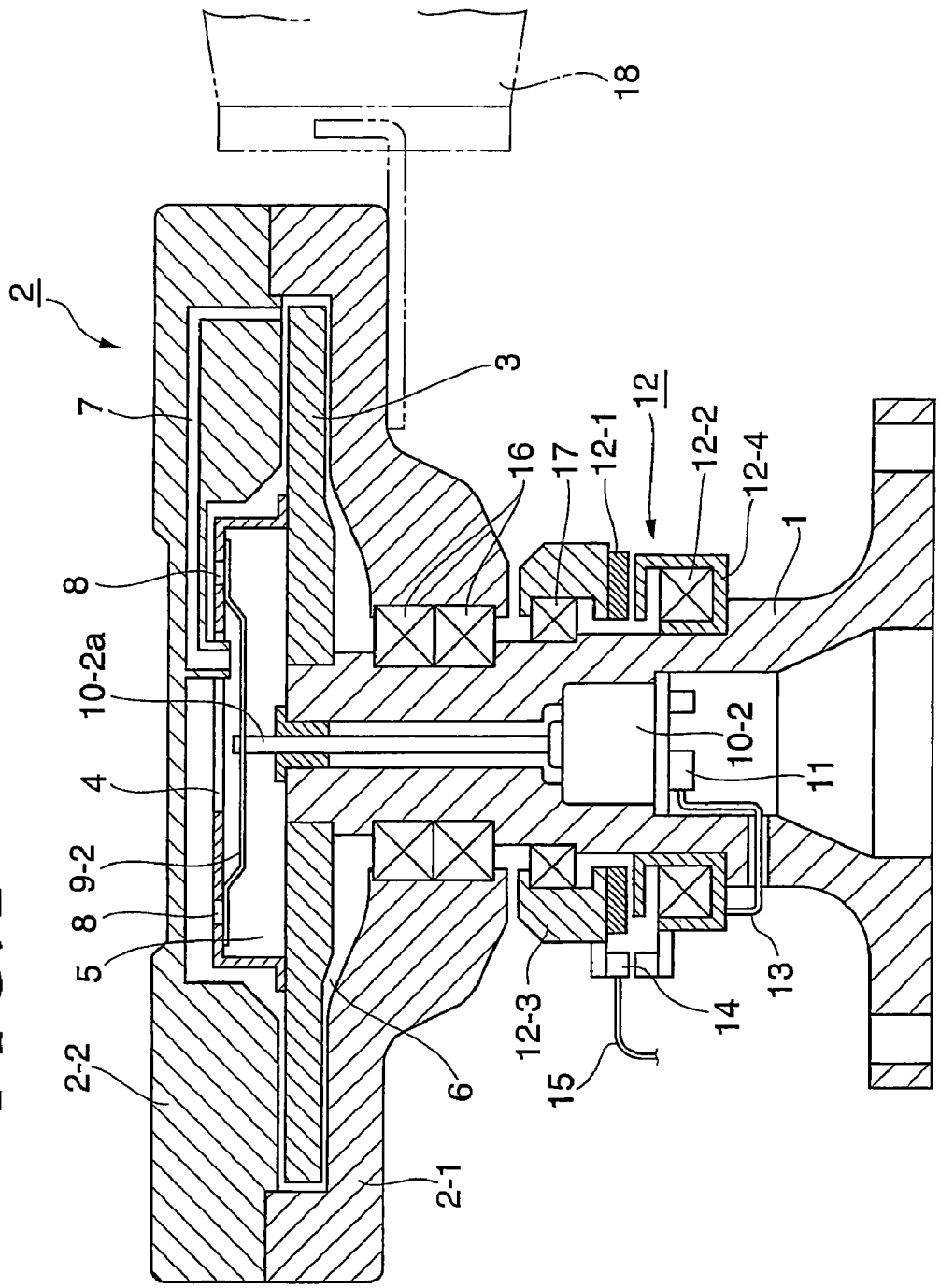
FIG. 2 is a longitudinal sectional view showing a second embodiment of this external control type fan-coupling device.

FIGS. 1 to 7 shown embodiments of an external control type fan-coupling device in the present invention. FIGS. 1 and 2 are longitudinal sectional views showing the external control type fan-coupling device using a rotary type solenoid type in an actuator. FIGS. 3 to 7 are longitudinal sectional views showing the external control type fan-coupling device using a straight advancing type solenoid type in the actuator. In these figures, reference numerals 1, 2 and 2-1 respectively designate a rotating shaft body (drive shaft), a seal device housing and a case. Reference numerals 2-2, 3 and 4 respectively designate a cover, a drive disk and a partition plate. Reference numerals 5, 6 and 7 respectively designate an oil reservoir chamber, a torque transmitting chamber and a circulating flow passage for oil collection. Reference numeral 8 designates an oil supply adjusting hole. Reference numerals 9-1 to 9-6 designate valve members for oil supply. Reference numerals 10-1, 10-2 designate actuators of the rotary type solenoid type. Reference numerals 10-3 to 10-6 designate actuators of the straight advancing type solenoid type. Reference numerals 11, 12 and 12-1 respectively designate a rectifier, an electric generator and a permanent magnet. Reference numerals 12-2, 13 and 14 respectively designate an electromagnetic coil, a lead wire for electric power supply and an ON/OFF switch (a relay or a magnetic switch). Reference numerals 15, 16, 17 and 18 respectively designate a lead wire for an input signal, a bearing for the seal device housing, a bearing for the permanent magnet and a fan.

Namely, In the external control type fan-coupling device shown in FIG. 1, the seal device housing 2 constructed by the case 2-1 and the cover 2-2 is supported in the rotating shaft body (drive shaft) 1 rotated by the operation of a drive section (engine) through the bearing 16 for the seal device housing. The interior of this seal device housing 2 is partitioned into the oil reservoir chamber 5 and the torque transmitting chamber 6 by the partition plate 4 with the oil supply adjusting hole 8. The drive disk 3 fixedly attached to the tip of the rotating shaft body 1 is stored within the torque transmitting chamber 6 so as to form a torque transmitting clearance between the drive disk 3 and the inner circumference of the-torque transmitting chamber 6.

The valve member 9-1 for oil supply opens and closes the oil supply adjusting hole 8 for flowing-out oil collected in the circulating flow passage 7 for oil collection arranged in the cover 2-2 to the torque transmitting chamber 6. This valve member 9-1 for oil supply is attached to a control bar 10-1a of the actuator 10-1 of the rotary type solenoid type arranged on the front face of the cover 2-2. The valve member 9-1 for oil supply is swung on the partition plate 4 by a rotating movement of the control bar 10-1a, and mechanically opens and closes the oil supply adjusting hole 8. When the actuator of the straight advancing type solenoid type is used, the oil supply adjusting hole 8 is opened and closed by forward and backward movements of the control bar 10-1a.

The electric generator 12 is constructed by the permanent magnet (multi-pole) 12-1 fixed to the engine or the vehicle body side, and the electromagnetic coil 12-2 fixed to the case 2-1 of the coupling device. In its structure, the permanent magnet (multi-pole) 12-1 is attached to a magnet support body 12-3 fixed to the engine or the vehicle body side and mutually rotatably attached to the outer circumference of the rotating shaft body (drive shaft) 1 through the bearing 17 for the permanent magnet. The electromagnetic coil 12-2 opposed to the permanent magnet 12-1 is fixed to the case 2-1 through an iron core 12-4. In this electric generator 12, an induced electric current is generated in the electromagnetic coil 12-2 by relatively rotating the permanent magnet (multi-pole) 12-1 fixed to the engine or the vehicle body side, and the electromagnetic coil 12-2 arranged on the coupling device side. This electric power is mechanically supplied to the actuator 10-1 through the lead wire 13 for electric power supply. In the operation principle of this electric generator 12, when the permanent magnet (multi-pole) 12-1 and the electromagnetic coil 12-2 are relatively rotated, a magnetic flux of the opposed permanent magnet 12-1 is flowed to the iron core 12-4 of the electromagnetic coil 12-2. The direction of this magnetic flux vector is changed by the relative rotation of the permanent magnet (multi-pole) 12-1 and the electromagnetic coil 12-2, and the frequency of a pole number of the permanent magnet 12-1. An electric current is generated in the electromagnetic coil 12-2 by an electromagnetic induction action due to changes of the size and direction of the magnetic flux vector flowed to the iron core 12-4 of the electromagnetic coil 12-2 (electric power is always continuously generated when the permanent magnet 12-1 and the electromagnetic coil 12-2 are relatively rotated).

The electric current generated in the electromagnetic coil 12-2 is flowed to the actuator 10-1 side through the lead wire 13 for electric power supply wired within the seal device housing 2. This electric current is then converted into a direct current by the rectifier (a diode bridge, etc.) 11 additionally arranged in the actuator 10-1, and operates the valve member 9-1 for oil supply as driving electric power of this actuator. A signal for operating the actuator 10-1 is given from the exterior by the lead wire 15 for an input signal connected to generate the electric power and control on energization of large amount of the electric power at the electromagnetic coil 12-2 through the none-contact type ON/OFF switch (relay) 14. No rectifier 11 is required when an alternating current actuator is used.

The external control type fan-coupling device shown in FIG. 2 is formed by a system in which the actuator 10-2 and the rectifier 11 are arranged within the rotating shaft body (drive shaft) 1, and a control bar 10-2a of the actuator 10-2 extends through the rotating shaft body 1 in the axial direction and operates the valve member 9-2 for oil supply. In its structure, the seal device housing 2 is constructed by the cover 2-2 and the case 2-1 supported by the rotating shaft body (drive shaft) 1 fixedly attaching the drive disk 3 to its tip through the bearing 16 for the seal device housing. The interior of the seal device housing 2 is partitioned into the oil reservoir chamber 5 and the torque transmitting chamber 6 for internally mounting the above drive disk by the partition plate 4 with the oil supply adjusting hole 8 fixedly attached to the above drive disk 3. The drive disk 3 fixedly attached to the tip of the above rotating shaft body 1 is stored within the above torque transmitting chamber 6 so as to form a torque transmitting clearance between the drive disk 3 and the inner circumferential face of the torque transmitting chamber 6. The control bar 10-2a of the actuator 10-2 of the rotary type solenoid type arranged within the rotating shaft body (drive shaft) 1 extends through the rotating shaft body 1 in the axial direction, and is projected into the oil reservoir chamber 5. The valve member 9-2 for oil supply for opening and closing the oil supply adjusting hole 8 formed in the partition plate 4 fixedly attached to the above drive disk 3 is fixedly attached to the tip of the above control bar 10-2a. With respect to its operation, similar to the above device of FIG. 1, the valve member 9-2 for oil supply is swung on the partition plate 4 by a rotating movement of the control bar 10-2a of the actuator 10-2 of the rotary type solenoid type, and mechanically opens and closes the oil supply adjusting hole 8. Further, in the electric generator 12 of this fan-coupling device, the permanent magnet (multi-pole) 12-1 is attached to the magnet support body 12-3 fixed to the engine or the vehicle body side, and mutually rotatably attached to the outer circumference of the rotating shaft body (drive shaft) 1 through the bearing 17 for the permanent magnet. The electromagnetic coil 12-2 opposed to this permanent magnet 12-1 is fixed to the rotating shaft body 1 through the iron core 12-4. When the actuator of the straight advancing type solenoid type is used in the case of this device, the swinging movement on the partition plate 4 is also made by forward and backward movements of the control bar 10-2a, and the oil supply adjusting hole 8 is opened and closed.

An electric current generated in the electromagnetic coil 12-2 is flowed to the actuator 10-2 side through the lead wire 13 for electric power supply extending through the rotating shaft body (drive shaft) 1 and wired. Similar to the above case, this electric current is converted into a direct current by the rectifier (a diode bridge, etc.) 11 additionally arranged in the actuator 10-2, and operates the valve member 9-2 for oil supply as driving electric power of this actuator. A signal for operating the actuator 10-2 is given from the exterior by the lead wire 15 for an input signal connected to the electromagnetic coil 12-2 through the ON/OFF switch (magnetic switch) 14. In the case of this device, no rectifier 11 is also required when an alternating current actuator is used.

In the case of the system in which the actuator 10-2 and the rectifier 11 are arranged within the rotating shaft body (drive shaft) 1, and the control bar 10-2a of this actuator 10-2 extends through the rotating shaft body 1 in the axial direction and operates the valve member 9-2 for oil supply as in the external control type fan-coupling device shown in the above FIG. 2, it is possible to arrange the oil reservoir chamber 5 within the partition plate 4 fixed to the drive disk 3 rotating at a speed higher than that of the seal device housing 2. Accordingly, it is possible to supply oil by large centrifugal force caused by the high speed rotation of the rotating shaft body (drive shaft) 1 so that oil supply ability is raised. Thus, a fan rotating response is improved. Further, moment load is reduced since there is no actuator heavy in weight on the cover side. In comparison with the external control type fan-coupling device shown in FIG. 1 of the system for fixing the actuator to the cover 2-2, it is possible to reduce the bearing 16 for supporting a driven section (the seal device housing 2 constructed by the case 2-1 and the cover 2-2), and reduce the load of an unillustrated bearing of an unillustrated engine side drive shaft for operating the rotating shaft body 1. Thus, durability of this bearing is improved, and the reliability of an entire cooling system of the engine is improved. Further, since the distance of the lead wire 13 for electric power supply from the electric generator 12 to the actuator 10-2 can be shortened, there is a merit able to reduce a rise in electric resistance due to heat generation of the fan-coupling device.

Figure 3:
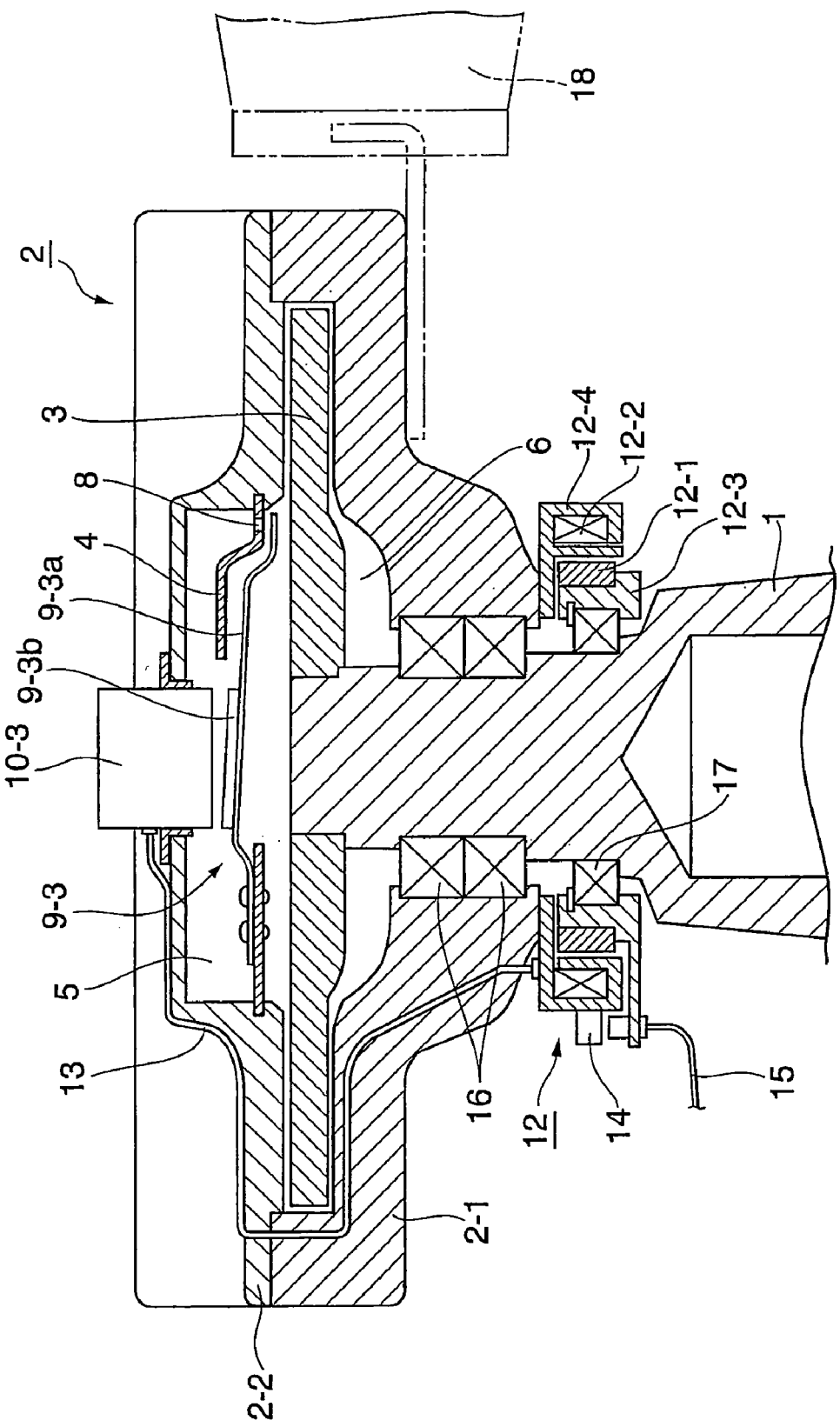
FIG. 3 is a longitudinal sectional view showing a third embodiment of this external control type fan-coupling device.

In the external control type fan-coupling device shown in FIG. 3, the actuator 10-3 of the straight advancing type solenoid type is adopted instead of the actuator 10-1 of the rotary type solenoid type in the external control type fan-coupling device shown in the above FIG. 1. Further, the valve member 9-3 for oil supply constructed by a leaf spring 9-3a and an armature 9-3b is used instead of the valve member 9-1 for oil supply. Driving electric power of the actuator 10-3 of the straight advancing type solenoid type is supplied through the lead wire 13 by the electric generator 12 shown in FIG. 1.

Namely, in the external control type fan-coupling device adopting this actuator 10-3 of the straight advancing type solenoid type, a base end portion of the leaf spring 9-3a is attached to the partition plate 4 such that the armature 9-3b of the valve member 9-3 for oil supply constructed by the leaf spring 9-3a and the armature 9-3b is located in the vicinity of a driving section of the actuator 10-3.

In the external control type fan-coupling device of the above construction, when the actuator 10-3 of the straight advancing type solenoid type is set to OFF, the armature 9-3b of the valve member 9-3 for oil supply is separated from the actuator 10-3 by the action of the leaf spring 9-3a so that the oil supply adjusting hole 8 arranged in the partition plate 4 is opened and oil is supplied to the torque transmitting chamber 6. In contrast to this, when the actuator 10-3 is set to ON, the armature 9-3b is attracted onto the actuator 10-3 side so that the leaf spring 9-3a comes in press contact with the partition plate 4 and the oil supply adjusting hole 8 is closed. Thus, the supply of the oil to the torque transmitting chamber 6 is stopped.

In the case of the external control type fan-coupling device shown in the above FIG. 3, a fan rotating response is improved by adopting the actuator 10-3 of the straight advancing type solenoid type having no operating bar. In addition to this, durability of the actuator 10-3 and the valve member 9-3 for oil supply and reliability of the entire cooling system of the engine are further improved. Further, no oil is leaked.

Figure 4:
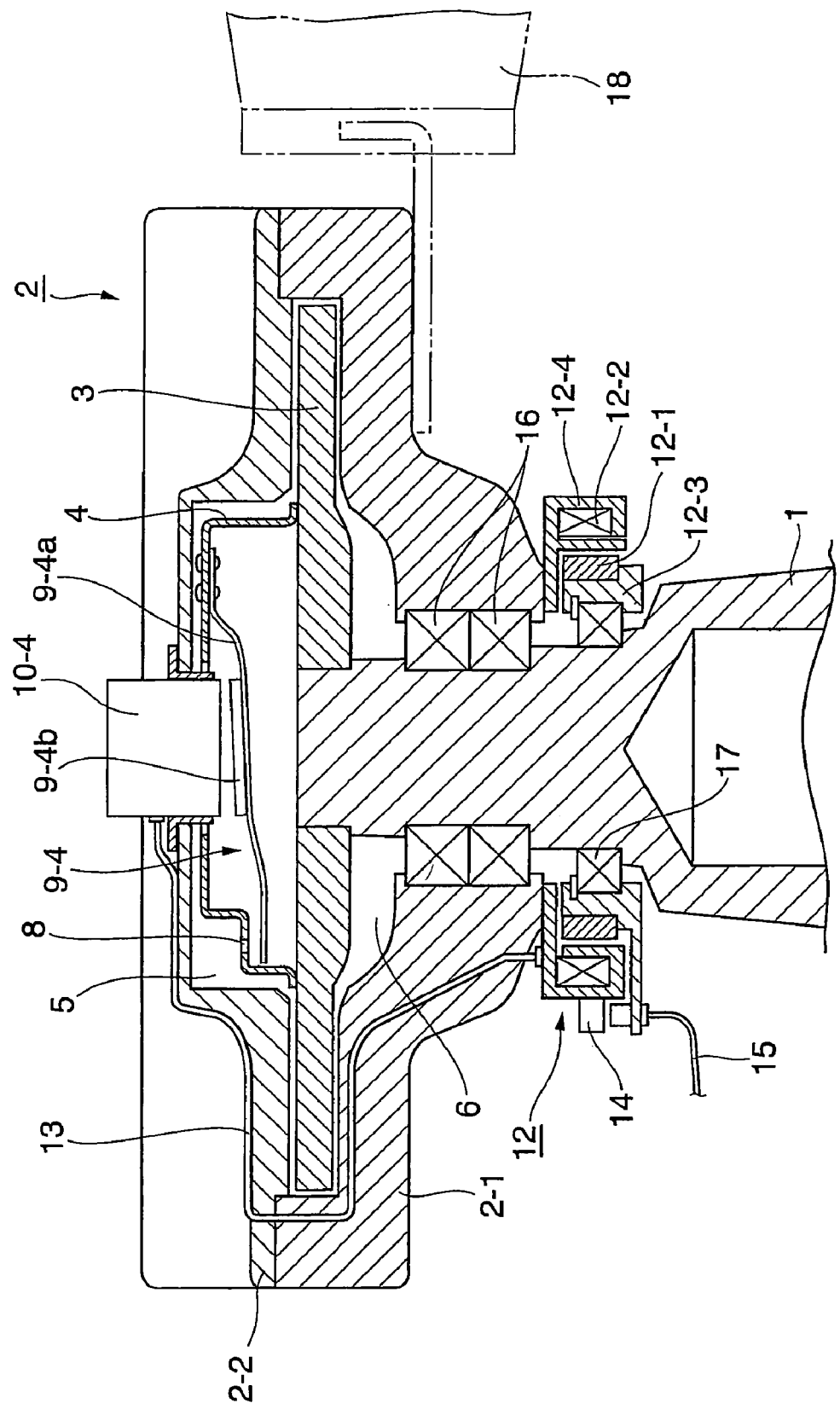
FIG. 4 is a longitudinal sectional view showing a fourth embodiment of this external control type fan-coupling device.

In the external control type fan-coupling device shown in FIG. 4, the present invention is applied to an external control type fan-coupling device in which the partition plate 4 with the oil supply adjusting hole 8 is fixedly attached to the drive disk 3, and an electric power supply system to the actuator 10-4 of the straight advancing type solenoid type is the same as the system shown in the above FIG. 1. In an operating mechanism of the valve member for oil supply, similar to the operating mechanism shown in the above FIG. 3, the valve member 9-4 for oil supply constructed by a leaf spring 9-4a and an armature 9-4b is used instead of the valve member 9-1 for oil supply in the external control type fan-coupling device shown in FIG. 1. The base end portion of the leaf spring 9-4a is constructed so as to be attached to the partition plate 4 fixedly attached to the drive disk 3 such that the armature 9-4b of the valve member 9-4 for oil supply is located in the vicinity of a driving section of the actuator 10-4 attached to the cover 2-2 of the seal device housing 2.

In the case of the external control type fan-coupling device adopting this actuator 10-4 of the straight advancing type solenoid type, when the actuator 10-4 is set to OFF, the armature 9-4b of the valve member 9-4 for oil supply is separated from the actuator 10-4 by the action of the leaf spring 9-4a. Thus, the oil supply adjusting hole 8 arranged in the partition plate 4 fixedly attached to the drive disk 3 is opened, and the oil is supplied to the torque transmitting chamber 6. In contrast to this, when the actuator 10-4 is set to ON, the armature 9-4b is attracted on the actuator 10-4 side. Thus, the leaf spring 9-4a comes in press contact with the partition plate 4, and the oil supply adjusting hole 8 is closed, and the supply of the oil to the torque transmitting chamber 6 is stopped.

In this external control type fan-coupling device shown in FIG. 4, a fan rotating response is improved by adopting the actuator 10-4 of the straight advancing type solenoid type having no operating bar. In addition to this, in comparison with the external control type fan-coupling device of a structure for attaching the partition plate 4 with the oil supply adjusting hole 8 to the cover 2-2 of the seal device housing 2, the centrifugal force of the rotating shaft body (drive shaft) 1 can be utilized in the supply of the oil to the torque transmitting chamber 6 so that the fan rotating response is further improved.

Figure 5:
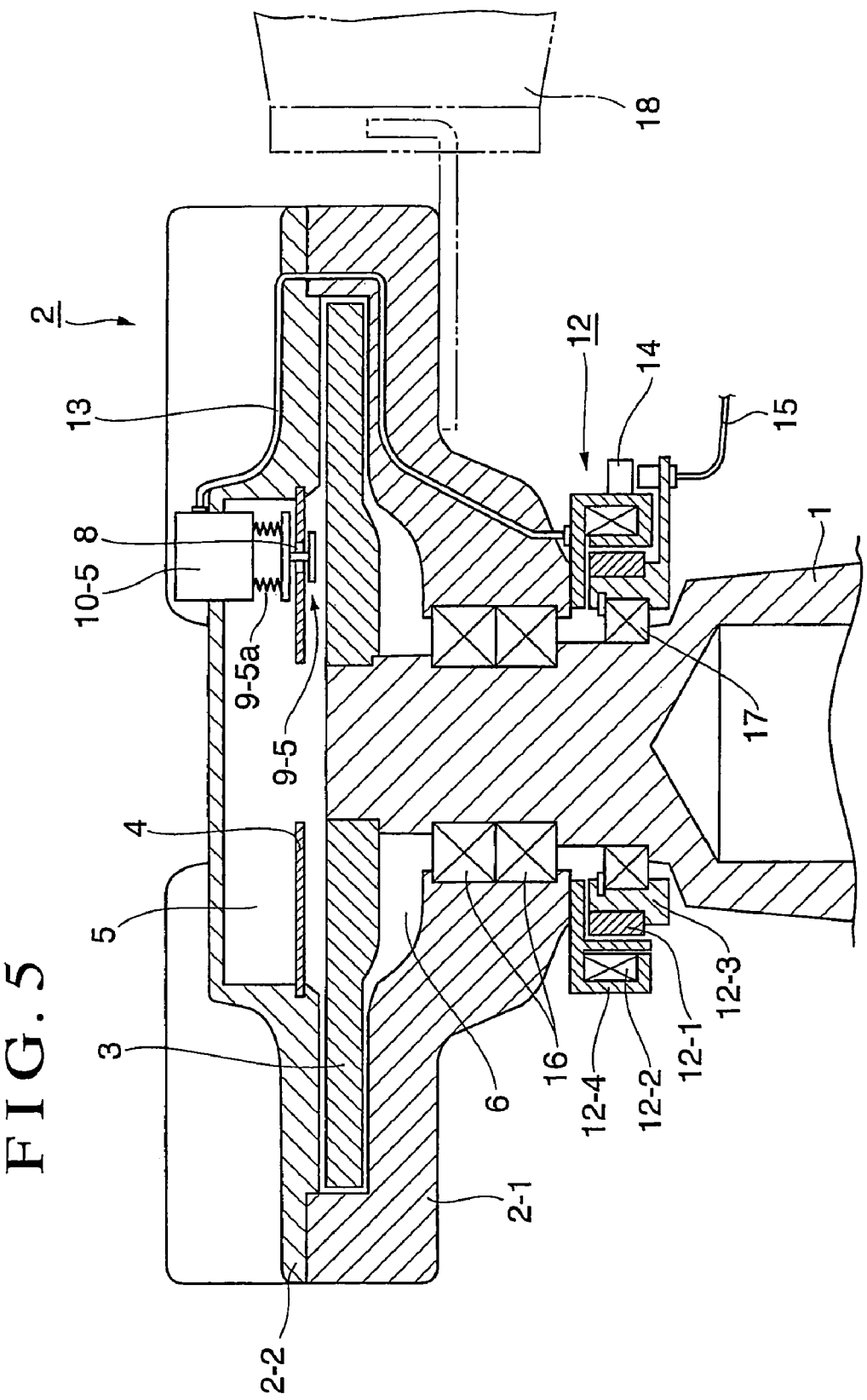
FIG. 5 is a longitudinal sectional view showing a fifth embodiment of this external control type fan-coupling device.

In the external control type fan-coupling device shown in FIG. 5, the present invention is applied to an external control type fan-coupling device in which the partition plate 4 with the oil supply adjusting hole 8 is fixedly attached to the cover 2-2 of the seal device housing 2, and an electric power supply system to the actuator 10-5 of the straight advancing type solenoid type is the same as the system shown in the above FIG. 1. In this external control type fan-coupling device, the actuator of the straight advancing type solenoid type is made compact. This compact actuator is not set to be coaxial with respect to the rotating shaft body (drive shaft) 1, but is set to be eccentric with respect to the rotating shaft body (drive shaft) 1, and the oil supply adjusting hole 8 is opened and closed. In its construction, the compact actuator 10-5 of the straight advancing type solenoid type is attached to an end portion of the cover 2-2 of the seal device housing 2, and the oil supply adjusting hole 8 of the partition plate 4 fixedly attached to the cover 2-2 of the seal device housing 2 is set to a structure in which the valve member 9-5 for oil supply is elastically supported by the above compact actuator 10-5 through a spring 9-5a.

In the case of the external control type fan-coupling device adopting this compact actuator 10-5 of the straight advancing type solenoid type, when the actuator 10-5 is set to OFF, the valve member 9-5 for oil-supply is separated from the actuator 10-5 by the action of the spring 9-5a. Thus, the oil supply adjusting hole 8 arranged in the partition plate 4 fixedly attached to the cover 2-2 is opened, and the oil is supplied to the torque transmitting chamber 6. In contrast to this, when the actuator 10-5 is set to ON, the valve member 9-5 for oil supply is sucked on the actuator 10-5 side. Thus, the valve member 9-5 comes in press contact with the partition plate 4, and the oil supply adjusting hole 8 is closed so that the supply of the oil to the torque transmitting chamber 6 is stopped.

The external control type fan-coupling device shown in this FIG. 5 adopts the compact actuator 10-5 of the straight advancing type solenoid type having no operating bar, and is set to a system for opening and closing the oil supply adjusting hole 8 by setting the actuator 10-5 to be eccentric with respect to the rotating shaft body (drive shaft) 1. Thus, a fan rotating response is improved, and the fan-coupling device is made compact and light in weight and is reduced in cost.

Figure 6:
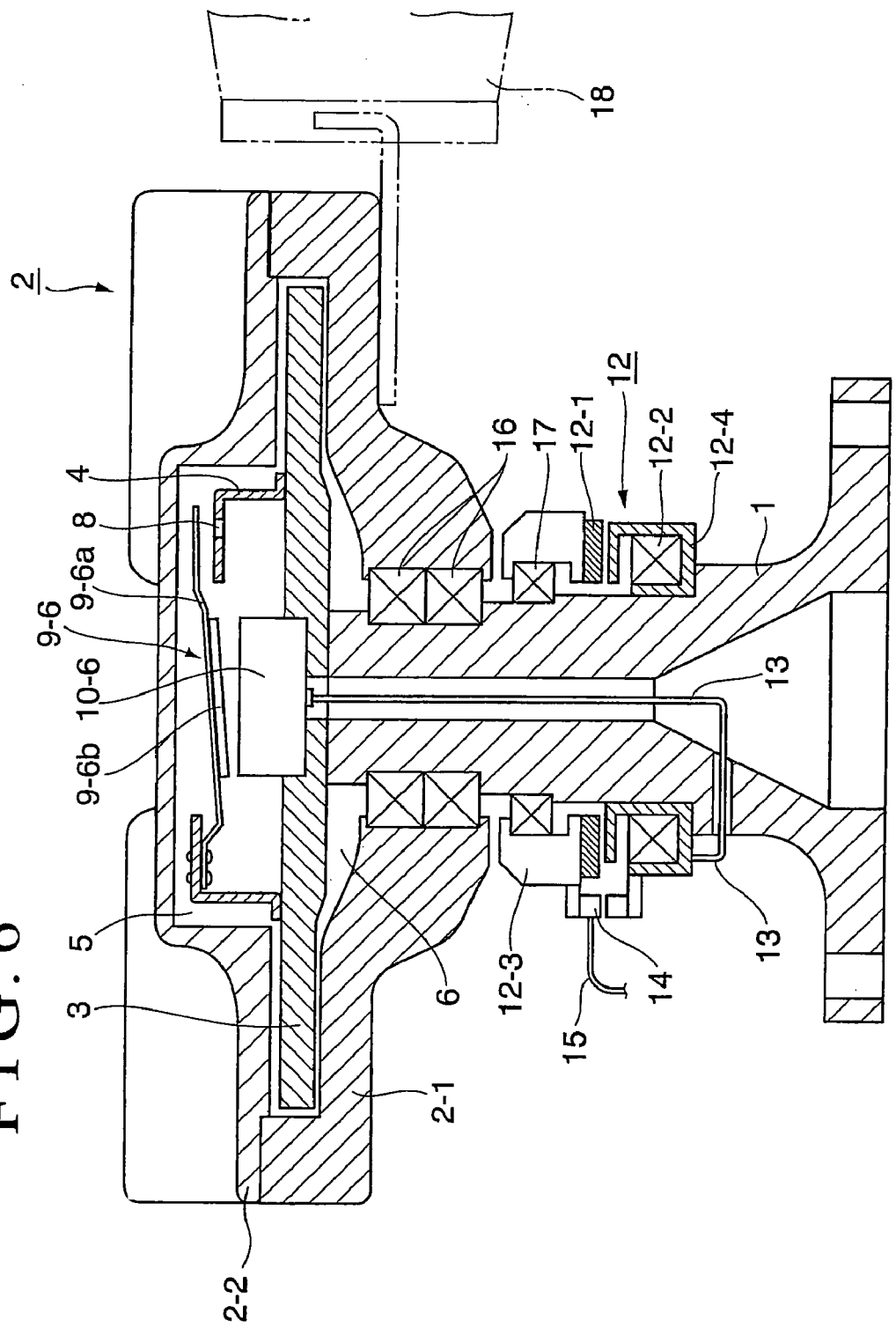
FIG. 6 is a longitudinal sectional view showing a sixth embodiment of this external control type fan-coupling device.

In the external control type fan-coupling device shown in FIG. 6, the actuator 10-6 of the straight advancing type solenoid type is attached to the drive disk 3 in the fan-coupling device of a type for fixedly attaching the partition plate 4 with the oil supply adjusting hole 8 to the drive disk 3. Further, the valve member 9-6 for oil supply constructed by a leaf spring 9-6a and an armature 9-6b is used. This external control type fan-coupling device is set to a system in which driving electric power of the actuator 10-6 of the straight advancing type solenoid type is supplied through the lead wire 13 by the electric generator 12 shown in FIG. 2.

In the case of the external control type fan-coupling device adopting this actuator 10-6 of the straight advancing type solenoid type, the base end portion of the leaf spring 9-6a is attached to the partition plate 4 such that the armature 9-6*b* of the valve member 9-6 for oil supply constructed by the leaf spring 9-6*a* and the armature 9-6*b* is located in the vicinity of a driving section of the actuator 10-6. Further, this external control type fan-coupling device is set to a system in which driving electric power of the actuator 10-6 is supplied through the lead wire 13 wired within the rotating shaft body (drive shaft) 1 by the electric generator 12 fixed to the rotating shaft body (drive shaft) 1.

In the external control type fan-coupling device of the above construction, when the actuator 10-6 of the straight advancing type solenoid type is set to OFF, the armature 9-6*b* of the valve member 9-6 for oil supply is separated from the actuator 10-6 by the action of the leaf spring 9-6*a*. Thus, the oil supply adjusting hole 8 arranged in the partition plate 4 is opened, and the oil is supplied to the torque transmitting chamber 6. In contrast to this, when the actuator 10-6 is set to ON, the armature 9-6*b* is attracted on the actuator 10-6 side. Thus, the leaf spring 9-6*a* comes in press contact with the partition plate 4, and the oil supply adjusting hole 8 is closed so that the supply of the oil to the torque transmitting chamber 6 is stopped.

In the case of the external control type fan-coupling device shown in this FIG. 6, similar to the fan-coupling devices shown in FIGS. 2 and 4, the fan rotating response is improved by adopting the actuator 10-6 of the straight advancing type solenoid type having no operating bar. In addition to this, the lead wire 13 for electric power supply can be wired within the rotating shaft body (drive shaft) 1. Accordingly, in comparison with a system wired through the interior of the case 2-1 and the cover 2-2 of the seal device housing 2, there are merits in that the centrifugal force applied to the lead wire 13 is small and there is no fear of disconnection, and a rise in electric resistance due to heat generation of the fan-coupling device can be reduced, etc.

Figure 7:
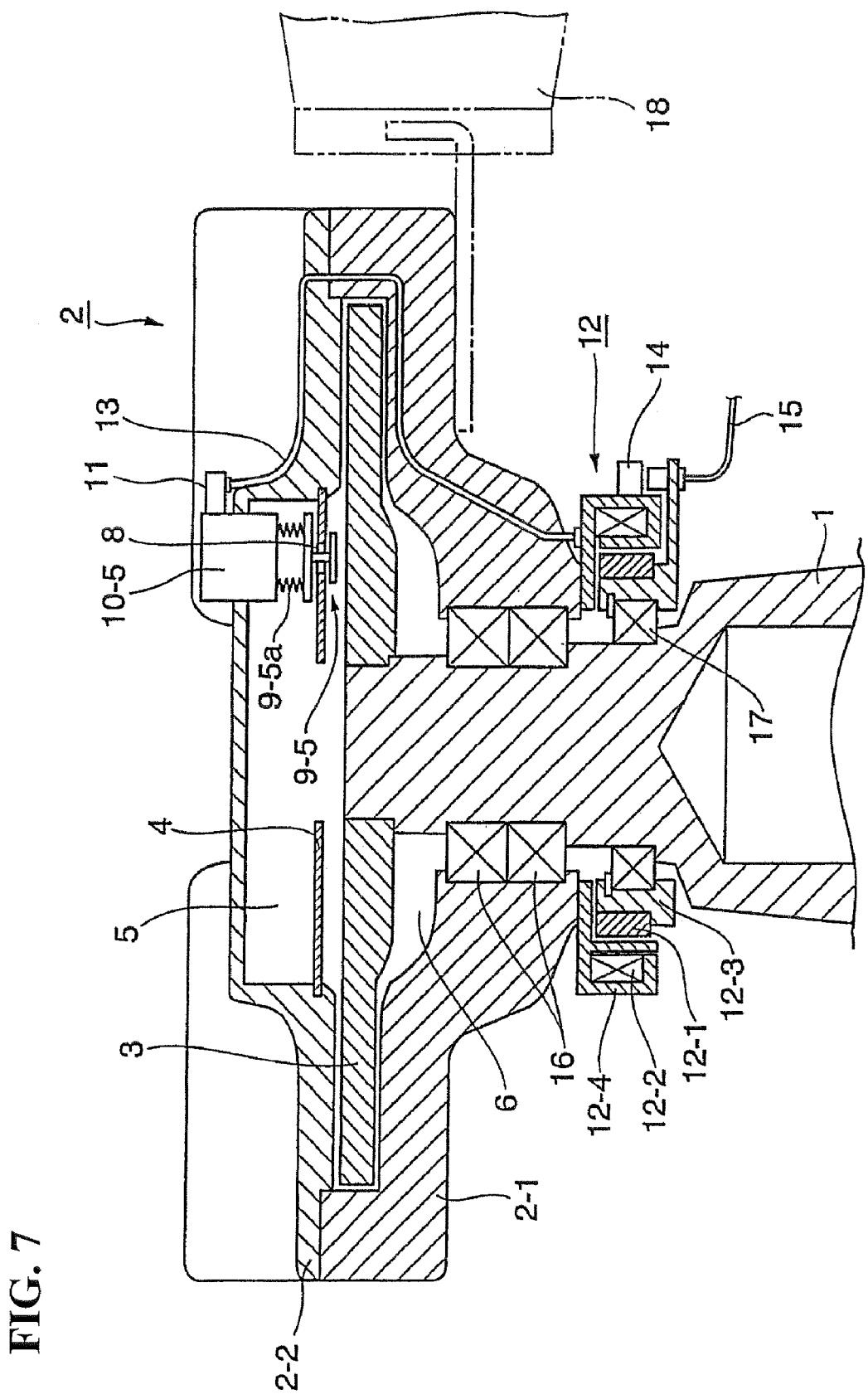
FIG. 7 is a longitudinal sectional view showing a seventh embodiment of this external control type fan-coupling device.

FIG. 7 shows an external control type fan-coupling device very similar to the device shown in FIG. 5. In this regard, the actuator 10-5 shown in FIG. 7 is straight advancing type solenoid actuator that is disposed eccentrically with respect to the rotating shaft body 1. However, unlike the external control type fan-coupling device of FIG. 5, the embodiment shown in FIG. 7 further includes a rectifier 11 that may be structurally and functionally similar to the rectifier 11 shown in FIGS. 1 and 2. Other structural and operational aspects of the embodiment shown in FIG. 7 are similar to the structural and operational aspects described with respect to FIG. 5.

In the fan-coupling devices of the constructions shown in the above FIGS. 1 and 2, the rotation of the fan 18 can be controlled by the following methods (1) and (2).

(1) When ECU judges that a rise in the rotating speed of the fan 18 is necessary from information of radiator water temperature, intake air temperature, an engine rotating speed, the stepping depth of an accelerator pedal, a vehicle speed, etc., ECU transmits an input signal to the ON/OFF switch (a relay or a magnetic switch) 14 through the lead wire 15 for an input signal, and turns on this switch. ECU then supplies electric power generated in the electromagnetic coil 12-2 of the electric generator 12 to actuators 10-1 to 10-6, and operates these actuators, and opens valve members 9-1 to 9-6 for oil supply, and raises the fan rotation. When the fan rotation is lowered, an electric power source is turned off. Each of OFF/ON at an unconducting time and ON/OFF at a conducting time can be executed by setting the actuators 10-1 to 10-6.

(2) The fan rotating speed is feedback-controlled when the fan rotation is controlled to an arbitrary rotating speed instructed by ECU.

In the case of the actuator of the rotary type solenoid type, plural oil supply adjusting holes 8 are arranged in the partition plate 4 by changing a radial direction position and a circumferential direction position, and can be thus sequentially opened from the oil supply adjusting hole of a position providing a smallest radius. Accordingly, the fan rotating speed can be controlled at multiple stages. Further, the fan rotating speed can be linearly controlled by gradually continuously opening the oil supply adjusting holes 8. Further, the fan rotating speed can be also finely controlled at multiple stages by gradually finely opening the oil supply adjusting holes 8 at multiple stages.

The external control type fan-coupling device of the present invention is set to a system in which the electric generator for supplying an electric current by utilizing the rotation of the drive shaft (rotating shaft body) is assembled into this coupling device, and the actuator for operating the valve member by a signal from the exterior in accordance with necessity is operated. Thus, it is not necessary to set the coil to be diametrically large-sized even in the external control type fan-coupling device for operating a large aperture fan for a large-sized vehicle. Further, the structure of the entire device is simplified and is made compact and light in weight so that layout property is improved. Further, responsibility is good and the present invention can be moreover easily applied to the existing external control type fan-coupling device.

What is claimed is:

1. An external control type fan-coupling device in which a seal device housing is constructed by a case of a nonmagnetic material supported through a bearing on a rotating shaft body fixedly attaching a drive disk to its tip, and a cover attached to the case; a partition plate fixedly attached to said cover for partitioning the interior of the seal device housing into an oil reservoir chamber and a torque transmitting chamber for internally mounting said drive disk; an oil circulating flow passage formed between said torque transmitting chamber and the oil reservoir chamber, and an oil supply adjusting hole formed in said partition plate; a valve member for opening and closing said oil supply adjusting hole is arranged within the oil reservoir chamber; a mechanism for controlling said oil circulating flow passage so as to be opened and closed by operating the valve member by an actuator; and the transmission of rotation torque from a drive side to a driven side is controlled by increasing and decreasing an effective contact area of oil in a torque transmitting clearance portion formed by the drive side and the driven side; wherein said actuator is attached to the cover of the seal device housing; a permanent magnet fixed to a stationary magnet support body and rotatably mounted relative to the shaft body via a second bearing, and an electromagnetic coil fixed to the case and opposed to said permanent magnet; a mechanism for operating the actuator by electric power generated in said electromagnetic coil attached to the cover of said seal device housing; and a non-contact type switch that can be energized to control said actuator.

2. The external control type fan-coupling device according to claim 1, wherein the actuator for operating said valve member is compact, and this compact actuator is attached to the cover of the seal device housing so as to be eccentric with respect to said rotating shaft body.

3. The external control type fan-coupling device according to claim 2, wherein said non-contact type switch has ON/OFF function.

4. The external control type fan-coupling device according to claim 2, wherein an alternating electric current induced in said electromagnetic coil is rectified to a direct current by a rectifier and the actuator is operated.

5. The external control type fan-coupling device according to claim 1, wherein said non-contact type switch has ON/OFF function.

6. The external control type fan-coupling device according to claim 5, wherein a rotary type solenoid or a straight advancing type solenoid type is used in said actuator.

7. The external control type fan-coupling device according to claim 1, wherein an alternating electric current induced in said electromagnetic coil is rectified to a direct current by a rectifier and the actuator is operated.

8. The external control type fan-coupling device according to claim 1, wherein a rotary type solenoid or a straight advancing type solenoid type is used in said actuator.

9. An external control type fan-coupling device in which a seal device housing is constructed by a case of a nonmagnetic material supported through a bearing on a rotating shaft body fixedly attaching a drive disk to its tip, and a cover attached to the case; a partition plate fixedly attached to said drive disk for partitioning the interior of the seal device housing into an oil reservoir chamber and a torque transmitting chamber for internally mounting said drive disk; an oil circulating flow passage formed between said torque transmitting chamber and the oil reservoir chamber, and an oil supply adjusting hole formed in said partition plate; a valve member for opening and closing said oil supply adjusting hole is arranged within the oil reservoir chamber; a mechanism for controlling said oil circulating flow passage so as to be opened and closed by operating the valve member by an actuator; and the transmission of rotation torque from a drive side to a driven side is controlled by increasing and decreasing an effective contact area of oil in a torque transmitting clearance portion formed by the drive side and the driven side; wherein said actuator is arranged within the rotating shaft body; a control bar operated by the actuator; said control bar extending axially through the interior of the rotating shaft body for controlling operation of the valve member; a mechanism for operating the actuator by electric power including a permanent magnet fixed to a stationary magnet support body and rotatably mounted relative to the shaft body via a second bearing, and an electromagnetic coil fixed to the rotating shaft body and opposed to said permanent magnet; and a non-contact type switch that can be energized to control said actuator.

10. The external control type fan-coupling device according to claim 9, wherein said non-contact type switch has ON/OFF function.

11. The external control type fan-coupling device according to claim 10, wherein a rotary type solenoid is used in said actuator.

12. The external control type fan-coupling device according to claim 9, wherein a rotary type solenoid or a straight advancing type solenoid type is used in said actuator.

13. The external control type fan-coupling device according to claim 9, wherein an alternating electric current induced in said electromagnetic coil is rectified to a direct current by a rectifier and the actuator is operated.

14. An external control type fan-coupling device in which a seal device housing is constructed by a case of a nonmagnetic material supported through a bearing on a rotating shaft body fixedly attaching a drive disk to its tip, and a cover attached to the case; a partition plate fixedly attached to said drive disk for partitioning the interior of the seal device housing into an oil reservoir chamber and a torque transmitting chamber for internally mounting said drive disk; an oil circulating flow passage formed between said torque transmitting chamber and the oil reservoir chamber, and an oil supply adjusting hole formed in said partition plate; a valve member for opening and closing said oil supply adjusting hole is arranged within the oil reservoir chamber; a mechanism for controlling said oil circulating flow passage so as to be opened and closed by operating the valve member by an actuator; and the transmission of rotation torque from a drive side to a driven side is controlled by increasing and decreasing an effective contact area of oil in a torque transmitting clearance portion formed by the drive side and the driven side; wherein said actuator is arranged within the case; a permanent magnet fixed to a stationary magnet support body and rotatably mounted relative to the shaft body via a second bearing, and an electromagnetic coil fixed to the rotary shaft body and opposed to said permanent magnet; the actuator being attached to the drive disk and being operated by electric power; and a non-contact type switch that can be energized to control said actuator.

15. The external control type fan-coupling device according to claim 14, wherein a straight advancing type solenoid is used in said actuator.

\* \* \* \* \*